US012619047B2

(12) United States Patent
Tsuruoka et al.

(10) Patent No.: US 12,619,047 B2
(45) Date of Patent: May 5, 2026

(54) LENS UNIT

(71) Applicants: NIDEC SANKYO CORPORATION, Nagano (JP); Panasonic Corporation, Osaka (JP)

(72) Inventors: Yasuo Tsuruoka, Nagano (JP); Akinori Yamamoto, Nagano (JP); Katsumi Umeda, Osaka (JP); Masanori Tanikawa, Osaka (JP); Shinya Okada, Osaka (JP)

(73) Assignees: NIDEC SANKYO CORPORATION, Nagano (JP); PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 784 days.

(21) Appl. No.: 17/375,188

(22) Filed: Jul. 14, 2021

(65) Prior Publication Data

US 2022/0019051 A1 Jan. 20, 2022

(30) Foreign Application Priority Data

Jul. 15, 2020 (JP) ................................. 2020-121287

(51) Int. Cl.
*G02B 7/02* (2021.01)

(52) U.S. Cl.
CPC ............. *G02B 7/028* (2013.01); *G02B 7/021* (2013.01)

(58) Field of Classification Search
CPC .......... G02B 7/02; G02B 7/028; G02B 7/021; G02B 7/022; G02B 22/0006; G03B 17/55;

(Continued)

(56) References Cited

U.S. PATENT DOCUMENTS 9,933,628 B2 * 4/2018 Ariji ...................... G02B 7/023
11,249,372 B2 * 2/2022 Choi ...................... H04N 23/50
(Continued)

FOREIGN PATENT DOCUMENTS

JP 2004325603 A * 11/2004 ............. G02B 7/026
JP 2006203053 A * 8/2006
(Continued)

OTHER PUBLICATIONS

Google Patents translation of Takada (JP 2004325603 A).*
Japan Patent Office, Japanese Office Action for Japanese Patent Application No. 2020-121287, Jan. 30, 2024.

*Primary Examiner* — Stephone B Allen
*Assistant Examiner* — Daniel J. Jordan
(74) *Attorney, Agent, or Firm* — IMAIZUMI IP LAW, PLLC; Toshikatsu Imaizumi

(57) ABSTRACT

A lens unit 1 includes a plurality of lenses aligned in a row along an optical axis L and a lens holder 2. A transparent conductive film 16, which functions as a heater, is disposed on an image-side lens surface 12 of the first lens L1 disposed the closest to an object side La. A flexible printed circuit board 8 that feeds power to the transparent conductive film 16 includes a flat surface portion 81 along an image-side flange surface 13 surrounding an outer peripheral side of the image-side lens surface 12, an extension portion 82 extending to an outer side in a radial direction, and a protruding portion 83 projecting to the outer side in the radial direction from the flat surface portion 81. The protruding portion 83 includes a first electrode 84A and a second electrode 84B electrically connected to the transparent conductive film 16.

12 Claims, 16 Drawing Sheets

(58) Field of Classification Search
CPC .... H05B 1/0227; H05B 1/023; H05B 1/0236;
H05B 3/0019; H05B 3/02; H05B 3/03;
H05B 3/20; H05B 3/34; H05B 3/145
USPC ........ 359/512, 549, 585, 754, 811, 819, 820
See application file for complete search history.

(56) References Cited

U.S. PATENT DOCUMENTS

| | | | |
|---|---|---|---|
| 2017/0083147 A1 * | 3/2017 | Su | G06F 3/0416 |
| 2018/0239105 A1 | 8/2018 | Lee et al. | |
| 2019/0041630 A1 * | 2/2019 | Park | H05B 3/26 |
| 2021/0294066 A1 * | 9/2021 | Hirata | H05B 1/0288 |

FOREIGN PATENT DOCUMENTS

| | | | | |
|---|---|---|---|---|
| JP | 4252959 B2 | 4/2009 | | |
| JP | 2019-168509 A | 10/2019 | | |
| WO | WO-2018079300 A1 * | 5/2018 | | G02B 7/021 |
| WO | 2019/225745 A1 | 11/2019 | | |

* cited by examiner

LENS UNIT

CROSS-REFERENCE TO RELATED APPLICATIONS

This application claims the benefits of Japanese Patent Application No. 2020-121287 filed Jul. 15, 2020. The content of Japanese Patent Application No. 2020-121287 is hereby incorporated by reference in its entirety.

BACKGROUND

Field of the Invention

At least an embodiment of the present invention relates to a lens unit in which a plurality of lenses are disposed on an optical axis.

Description of the Related Documents

Japanese Patent No. 4252959 and Japanese Unexamined Patent Application Publication No. 2019-168509 disclose a lens unit used in an optical device. The lens unit of Japanese Patent No. 4252959 includes a plurality of lenses disposed on an optical axis and a lens holder that holds the plurality of lenses. The lens holder has a lens barrel (support means) and a case (casing) that covers the lens barrel. Moreover, a similar lens unit is disclosed also in Japanese Unexamined Patent Application Publication No. 2019-168509.

In the lens unit of Japanese Patent No. 4252959 and Japanese Unexamined Patent Application Publication No. 2019-168509, a heater is disposed inside the lens unit in order to suppress condensation inside the lens unit when the lens unit is used outdoors. For example, Japanese Patent No. 4252959 describes the use of a conductive film such as an ITO film formed on the lens surface as a heater. In addition, Japanese Unexamined Patent Application Publication No. 2019-168509 describes a flexible printed circuit board with an electric heating wire (heater) disposed between a first lens and a second lens.

In a lens unit including a plurality of lenses, positioning of the lenses in the optical axis direction is performed by bringing an outer peripheral portion of the lens into contact with the other lenses or a lens barrel in the optical axis direction. Here, Japanese Patent No. 4252959 describes that, when the ITO film is used as a heater, power is fed by using an extraction electrode disposed on an outer peripheral portion of the ITO film and a wiring member (connection line) connected to the extraction electrode, but if the connection portion between the extraction electrode and the wiring member is sandwiched between the lens and the lens barrel or another lens, the connection portion is pressed, and the wiring member and the electrode are crushed. This may cause nonconformities such as a short circuit.

For example, in Japanese Unexamined Patent Application Publication No. 2019-168509, a flexible printed circuit board is used as a wiring member. When the flexible printed circuit board is used as a wiring member for feeding power to the ITO film, if the connection portion between the extraction electrode of the ITO film and the flexible printed circuit board is sandwiched between the lens and the lens barrel or another lens, the connection portion will be crushed, which causes a short circuit. For example, if a fine wiring pattern made of a conductive material is formed on a flexible printed circuit board, there is a risk that the wiring pattern is crushed, and a short-circuit occurs between the wirings.

In view of the above-described problems, a problem of at least an embodiment of the present invention is to avoid the occurrence of nonconformities such as a short circuit caused by a crush of a connection portion between an electrode for feeding power to a conductive film (heater) disposed on the surface of a lens and an electrode on a flexible printed circuit board.

SUMMARY

In order to solve the above problem, the lens unit of at least an embodiment of the present invention has a first lens disposed the closest to an object side, a second lens disposed on an image side with respect to the first lens, a lens holder including a first housing portion that accommodates the first lens and a second housing portion that accommodates the second lens, a conductive film disposed on an image-side surface of the first lens, and a flexible printed circuit board that feeds power to the conductive film, in which the image side surface includes an image-side lens surface and an image-side flange surface that surrounds the image-side lens surface, the flexible printed circuit board includes a flat surface portion along the image-side flange surface, an extension portion extending to an outer side in a radial direction, and a protruding portion that projects to the outer side in the radial direction from the flat surface portion, and the protruding portion includes an electrode electrically connected to the conductive film.

According to at least an embodiment of the present invention, since the first lens can be heated by the conductive film, condensation inside the lens unit which causes lowering the optical performance can be suppressed. In addition, in the flexible printed circuit board that feeds power to the conductive film, electrodes for connection to the conductive film are disposed on the protruding portion that projects to the outer side in the radial direction. Therefore, interference of the connection portion between the electrode on the flexible printed circuit board and the extraction electrode on the conductive film side in contact with the electrode with a component disposed on the image side of the first lens (the second lens or the second housing portion, for example) can be avoided easily. Thus, there is little risk that the electrodes and wiring on the flexible printed circuit board are sandwiched and crushed between the first lens and the other components (the second lens or the second housing portion), and there is little risk of short-circuiting of the crushed electrodes and wiring.

In at least an embodiment of the present invention, the conductive film is a transparent conductive film, and the transparent conductive film is preferably disposed on the image-side lens surface. In this way, since the image-side lens surface of the first lens can be directly heated by the transparent conductive film, condensation inside the lens unit which causes lowering of the optical performance can be suppressed.

In at least an embodiment of the present invention, it is preferable that the transparent conductive film includes arm portions disposed on the image-side flange surface, and the arm portions are connected to the electrodes via an extraction electrode disposed on the image-side flange surface. In this way, there is little risk that the electrodes on the flexible printed circuit board is short-circuited with the transparent conductive film at positions other than the extraction electrodes.

In at least an embodiment of the present invention, it is preferable that a blackened film formed on the image-side flange surface is provided, and the arm portions and the extraction electrodes are stacked on top of the blackened films. In this way, since the flexible printed circuit board overlaps with the blackened film, lowering of the optical performance caused by the placement of the flexible printed circuit board can be suppressed. In addition, since ghosting caused by the light transmitted through the image-side flange surface can be suppressed by the blackened film, the lowering of the optical performance caused by ghosting can be suppressed. Further, when irregularities (shibo) are formed on the image-side flange surface for diffusing the light, the irregularities (shibo) are filled and smoothed by the blackened film. Therefore, the arm portions of the transparent conductive film and the extraction electrodes can be easily formed on the image-side flange surface.

In at least an embodiment of the present invention, it is preferable that the conductive film is made of a metal thin film, the metal thin film is disposed on a part in a circumferential direction of the image-side flange surface, and a tip end portion in the circumferential direction of the metal thin film is connected to the electrode. In this way, the image-side flange surface of the first lens can be heated directly by the metal thin film. In addition, compared with the case where a conductive film is formed on the image-side lens surface, influence of ghosting or the like on the optical performance can be reduced.

In at least an embodiment of the present invention, it is preferable that a blackened film formed on the image-side flange surface is provided, the metal thin film is laminated on the blackened film, a protective film is laminated on the metal thin film, the metal thin film is covered by the protective film over the entire range except for the tip end portion, the flat surface portion is annular, and the flat surface portion is disposed on the protective film. In this way, since the flexible printed circuit board overlaps with the blackened film, lowering of the optical performance caused by the placement of the flexible printed circuit board can be suppressed. In addition, since ghosting caused by the light transmitted through the image-side flange surface can be suppressed by the blackened film, the lowering of the optical performance caused by ghosting can be suppressed. Further, since the protective film is laminated on top of the metal thin film, the metal thin film can be protected. In particular, in a high-temperature and high-humidity state, there is a risk that the metal thin film is oxidized and cracked, resulting in a change in a resistance value, but the occurrence of cracks can be suppressed by providing the protective film. Therefore, the change in the resistance value can be suppressed, and the change in a heat generation amount can be suppressed. Further, when the flexible printed circuit board is disposed on the first lens, the protective film can be used as a fixing surface for fixing the flat surface portion.

In at least an embodiment of the present invention, it is preferable that the flexible printed circuit board includes a first notch portion adjacent to the protruding portion in the circumferential direction, and the first notch portion is notched toward an inner side in the radial direction. By providing a notch portion at such a position, warping of an outer peripheral portion of the flexible printed circuit board can be suppressed. In addition, since the wiring and electrodes can be separated by the notch portion, the risk of short-circuiting of the wiring and electrodes can be reduced.

In at least an embodiment of the present invention, it is preferable that the protruding portion includes a first protrusion portion disposed on one side in the circumferential direction of the extension portion and a second protrusion portion disposed on the other side in the circumferential direction of the extension portion, and the first notch portion is provided between the extension portion and the first protrusion portion and between the extension portion and the second protrusion portion. In this way, since the positive and negative electrodes can be separated from the extension portion by the notch portion, the positive and negative electrodes and the wiring of the extension portion are hardly short-circuited. In addition, since the positive and negative electrodes can be concentrated close to the extension portion, the wiring to the positive and negative electrodes can be made short and simple in shape.

In at least an embodiment of the present invention, it is preferable that the flat surface portion is annular and a connecting portion connecting to the extension portion is provided on a part in the circumferential direction of the flat surface portion, and the flexible printed circuit board includes a second notch portion having the inner peripheral edge of the connecting portion notched toward the outer side in the radial direction. In this way, the risk of short-circuiting between the wiring connected to the electrode of the first protrusion portion disposed on one side in the circumferential direction of the connecting portion and the wiring connected to the electrode of the second protrusion portion disposed on the other side in the circumferential direction of the connecting portion can be reduced. In addition, warping of the inner peripheral portion of the flexible printed circuit board can be suppressed.

In at least an embodiment of the present invention, the first notch portion and the second notch portion are adhesive application grooves. In this way, when the flexible printed circuit board is fixed to the image-side flange surface, the fixing strength can be enhanced. In addition, since the vicinity of the protruding portion can be fixed, the electrodes provided on the protruding portion are unlikely to be lifted from the image-side flange surface.

In at least an embodiment of the present invention, the flexible printed circuit board preferably includes a heater disposed on the flat surface portion. In this way, since both the transparent conductive film and the heater on the flexible printed circuit board generate heat, the risk of condensation can be reduced.

In at least an embodiment of the present invention, it is preferable that the first housing portion includes a regulation portion having a lens seating surface which is brought into contact with the image-side flange surface, and a counterbore portion recessed to the outer side in the radial direction from the inner peripheral edge of the regulation portion, the flat surface portion is disposed on the inner peripheral side of the regulation portion, and the protruding portion is disposed on the counterbore portion. In this way, the protruding portion where the electrode is disposed does not interfere with the regulation portion. Therefore, there is little risk that the connection portion between the electrode on the flexible printed circuit board and the extraction electrode on the transparent conductive film side in contact with this electrode is sandwiched between the lens holder and the first lens. Therefore, there is little risk that the wiring constituting the electrodes is crushed and short-circuited.

According to at least an embodiment of the present invention, since the first lens can be heated directly by the conductive film, condensation inside the lens unit which causes lowering of the optical performance can be suppressed. In addition, in the flexible printed circuit board that feeds power to the conductive film, electrodes for connection to the conductive film are disposed on the protruding portion that projects to the outer side in the radial direction. Therefore, interference of the connection portion between the electrode on the flexible printed circuit board and the extraction electrode on the conductive film side in contact with the electrode with a component disposed on the image side of the first lens (the second lens or the second housing portion, for example) can be avoided easily. Thus, since there is little risk that the electrodes and wiring on the flexible printed circuit board are sandwiched and crushed between the first lens and the other components (the second lens or the second housing portion), there is little risk of short-circuiting of the crushed electrodes and wiring.

BRIEF DESCRIPTION OF THE DRAWINGS

Embodiments will now be described, by way of example only, with reference to the accompanying drawings which are meant to be exemplary, not limiting, and wherein like elements are numbered alike in several figures, in which.

DETAILED DESCRIPTION

Figure 1:
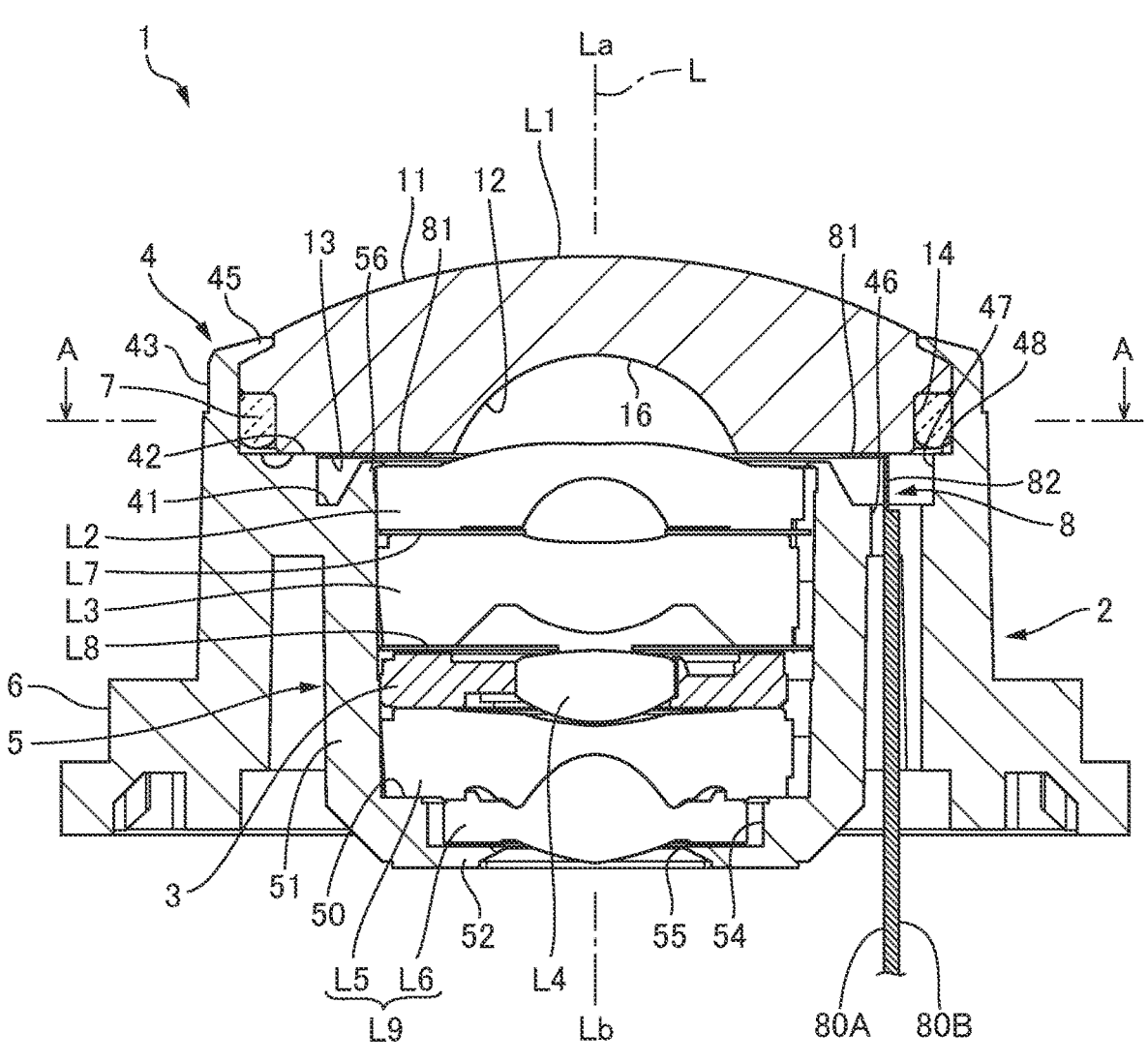
FIG. 1 is a cross-sectional view of a lens unit according to an embodiment of the present invention.

Referring to the drawings, an embodiment of a lens unit to which at least an embodiment of the present invention is applied will be described below.
Entire Configuration FIG. 1 is a cross-sectional view of the lens unit 1 according to the embodiment of the present invention. In FIG. 1, reference character L denotes an optical axis of the lens unit 1. Reference character La denotes one side in an optical axis L direction and is an object side (subject side) of the lens unit 1. Reference character Lb denotes the other side in the optical axis L direction and is an image side of the lens unit 1. The lens unit 1 includes a plurality of lenses aligned in a row along the optical axis L and a lens holder 2 that holds the plurality of lenses. The plurality of lenses include a first lens L1, a second lens L2, a third lens L3, a fourth lens L4, a fifth lens L5, and a sixth lens L6. A light-shielding plate L7 is disposed between the second lens L2 and the third lens L3, and a diaphragm L8 is disposed between the third lens L3 and the fourth lens L4.

Among the plurality of lenses, the first lens L1 located the closest to the object side La, and the fourth lens L4 are glass lenses. The fourth lens L4 is disposed inside the lens holder 2 in a state fixed to a frame-shaped holder 3. The second lens L2, the third lens L3, the fifth lens L5, and the sixth lens L6 are plastic lenses. The sixth lens L6 and the fifth lens L5 located the closest to the image side Lb constitute a cemented lens L9. The number and configuration of the lenses held in the lens holder 2 are not limited to the above number and configuration.

The lens holder 2 is made of resin. The lens holder 2 includes a first housing portion 4 that holds the first lens L1, a second housing portion 5 that is disposed on the image side Lb of the first housing portion 4, and a lens case 6 that surrounds the outer peripheral side of the second housing portion 5. The lens case 6 extends from an outer peripheral end portion of the first housing portion 4 to the image side Lb. The second lens L2, the third lens L3, the fourth lens L4, and the cemented lenses L9 (the fifth lens L5 and the sixth lens L6) are held in the second housing portion 5.

Figure 2:
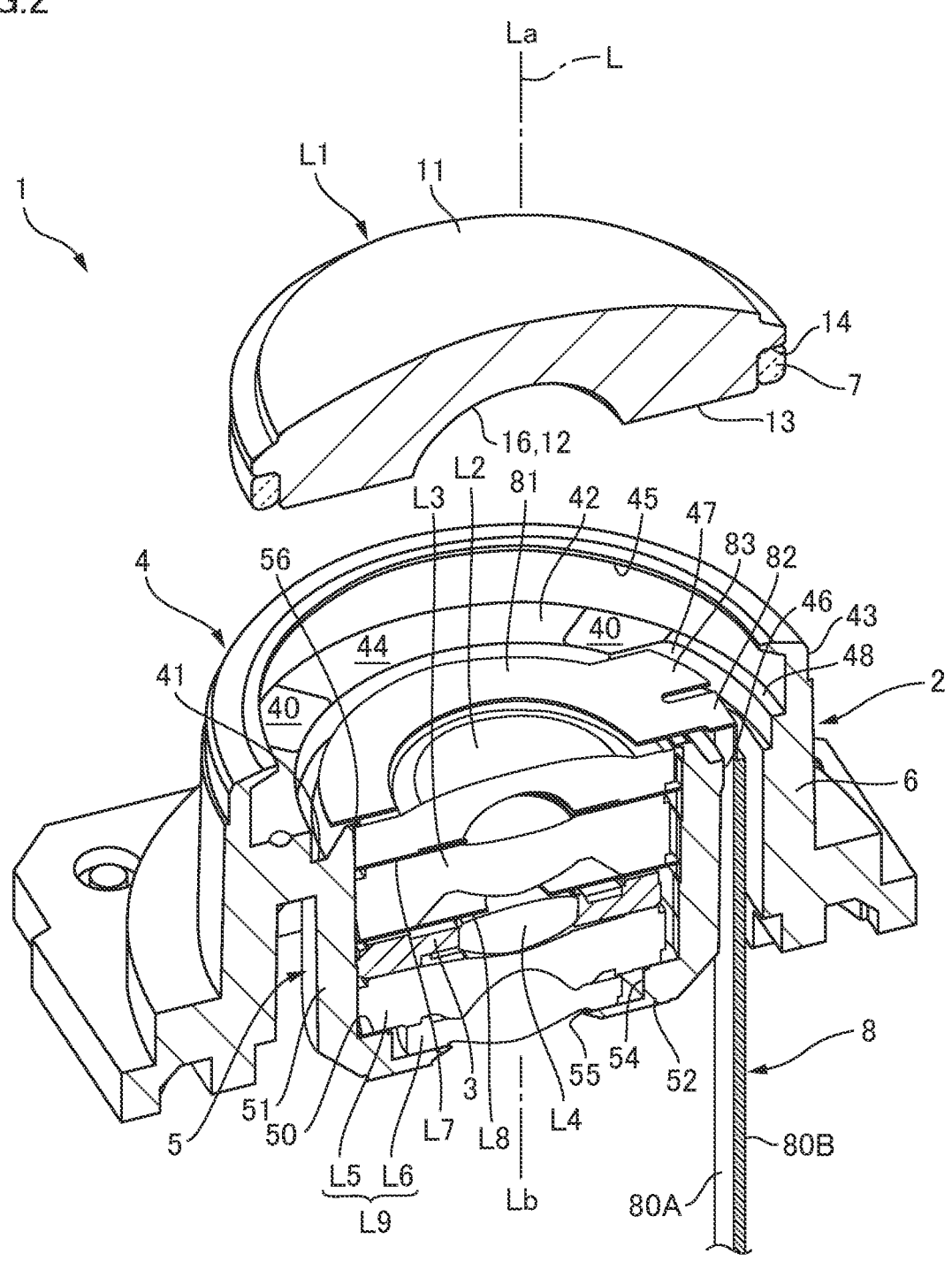
FIG. 2 is an exploded sectional perspective view of the lens unit of FIG. 1.
Figure 3:
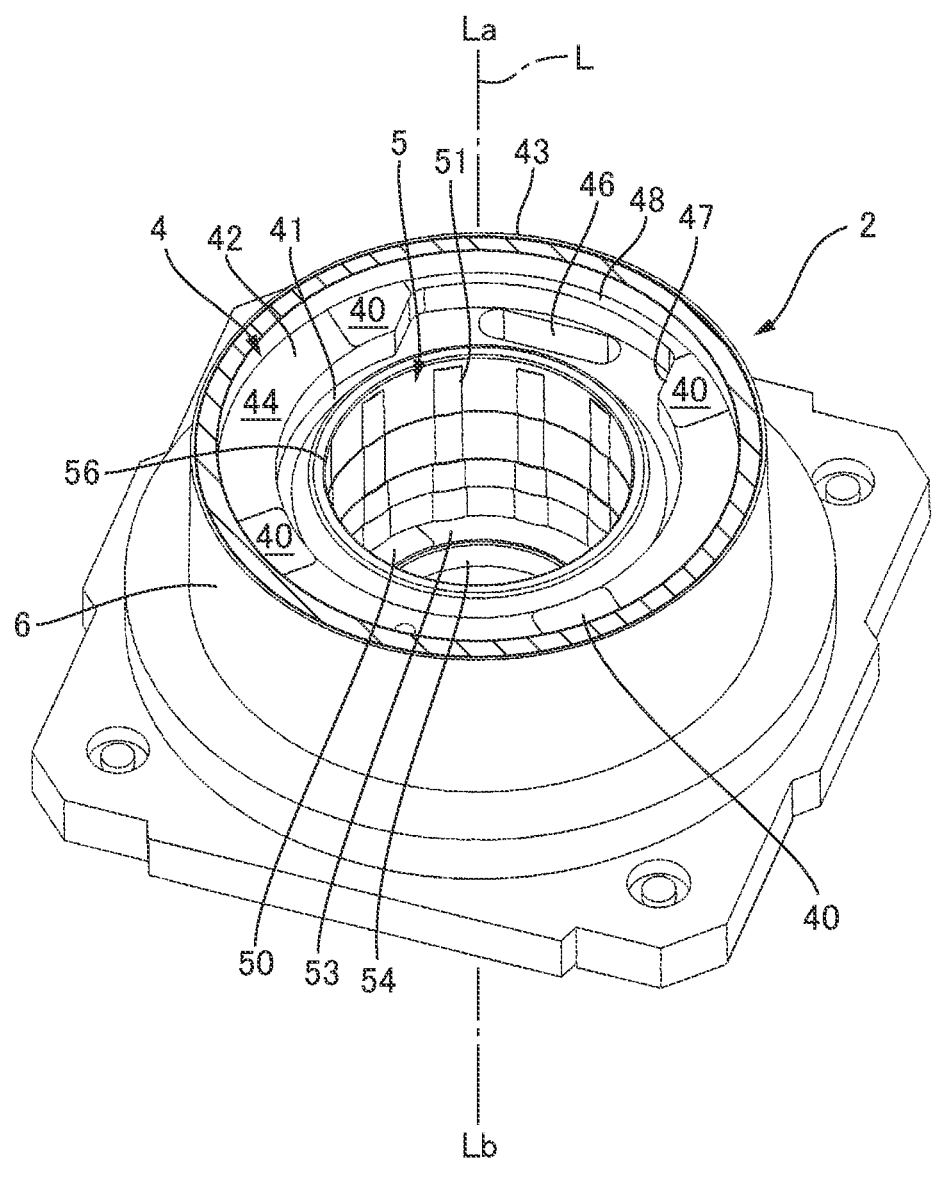
FIG. 3 is a perspective view of a lens holder.
Figure 4A:
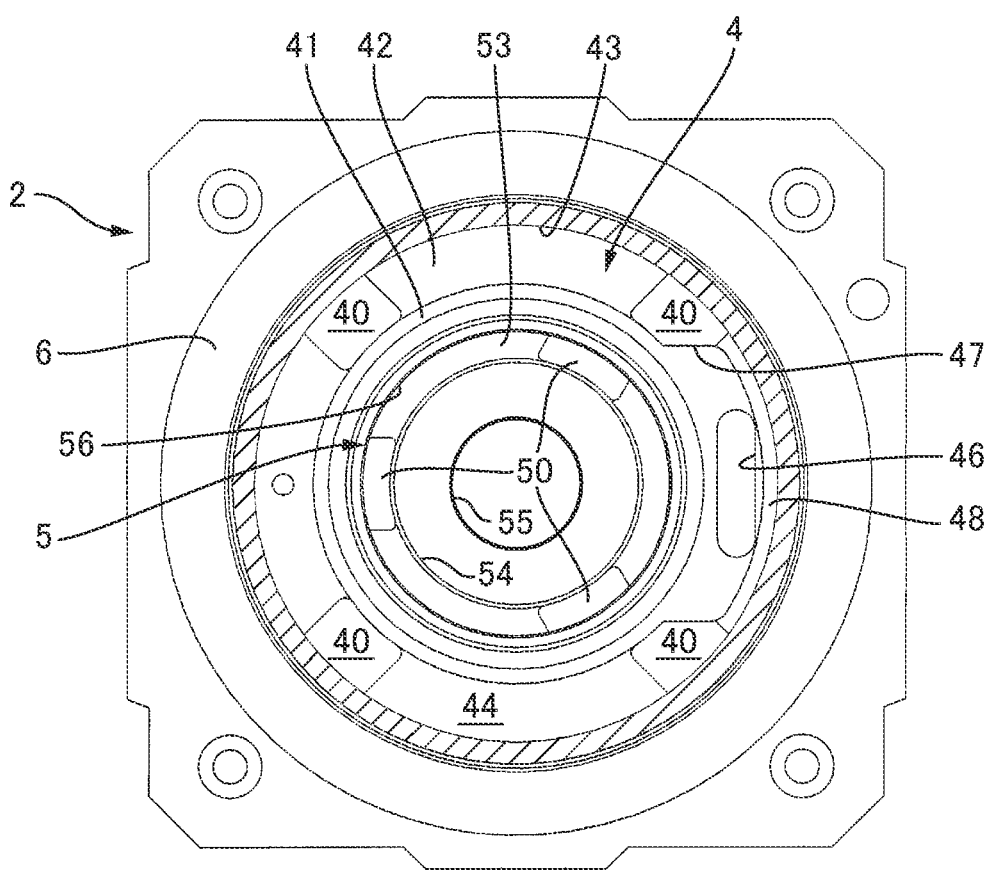
FIG. 4A is a plan view of the lens holder and FIG. 4B is a plan view of the lens unit from which a first lens and an O-ring are removed.
Figure 4B:
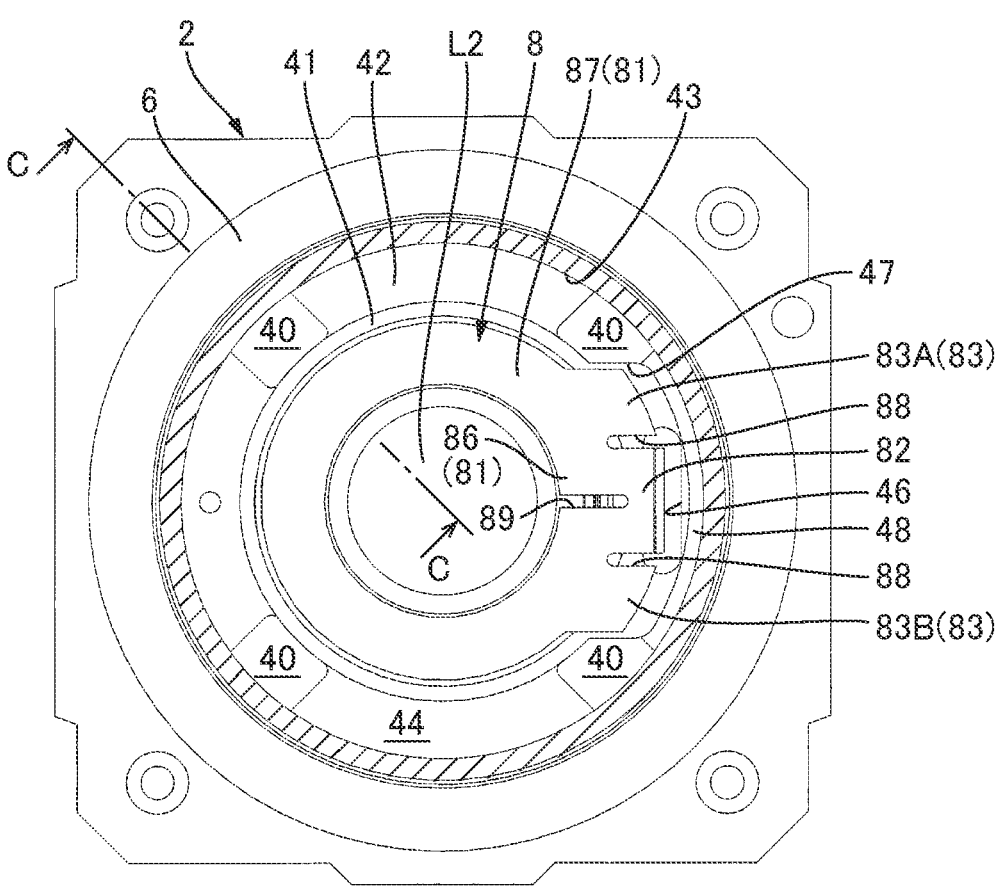

FIG. 2 is an exploded sectional perspective view of the lens unit 1 of FIG. 1. FIG. 3 is a perspective view of the lens holder 2. FIG. 4A is a plan view of the lens holder 2 and FIG. 4B is a plan view of the lens unit 1 from which the first lens L1 and an O-ring 7 are removed. FIGS. 3 and 4 are views in which a portion (caulking portion 45) above an A-A position in FIG. 1 are not shown. As shown in FIGS. 1 and 2, the first lens L1 is disposed in the lens holder 2 with reference to an inner peripheral surface of the first housing portion 4. Moreover, the second lens L2, the third lens L3, the fourth lens L4, and the cemented lenses L9 (the fifth lens L5 and the sixth lens L6) are disposed with reference to an inner circumferential surface of the second housing portion 5.

The first lens L1 is positioned in the optical axis L direction with reference to a lens seating surface 40 formed at the bottom part of the first housing portion 4. As shown in FIGS. 1 and 3, the bottom part of the first housing portion 4 includes an annular connection portion 41 that connects to the outer peripheral surface of the second housing portion 5, an annular regulation portion 42 that projects to the object side La on the outer peripheral side of the annular connection portion 41, and a peripheral wall portion 43 that rises from the outer peripheral edge of the regulation portion 42 to the object side La.

As shown in FIGS. 3 and 4, the regulation portion 42 includes protruding portions at a plurality of positions, slightly protruding from an annular end surface 44 facing the object side La, and the tip end surface of each protruding portion is the lens seating surface 40. In the present embodiment, the lens seating surfaces 40 are provided at four locations at approximately equal angular intervals around the optical axis L. The outer peripheral portion of the first lens L1 is in contact with the lens seating surface 40, and the first lens L1 is caulked and fixed by the caulking portion 45 provided at the tip end of the peripheral wall portion 43. The gap between the first lens L1 and the first housing portion 4 is sealed by the O-ring 7.

As shown in FIGS. 1 and 2, the second housing portion 5 includes a cylindrical portion 51 that connects to the annular connection portion 41 of the first housing portion 4 and a bottom portion 52 provided at an end portion of the image side Lb of the cylindrical portion 51 extending in the optical axis L direction. The second lens L2, the third lens L3, the fourth lens L4, and the cemented lens L9 (the fifth lens L5 and the sixth lens L6) are positioned in the optical axis L direction with reference to the lens seating surface 50 (see FIGS. 3 and 4A) formed on the bottom portion 52 of the second housing portion 5.

The bottom portion 52 of the second housing portion 5 includes protruding portions at a plurality of positions, slightly protruding from an annular bottom surface 53 facing the object side La, and the tip end surface of each protruding portion is the lens seating surface 50. As shown in FIG. 4A, in the present embodiment, the lens seating surfaces 50 are provided at three locations at approximately equal angular intervals around the optical axis L. Further, the second housing portion 5 includes a recess portion 54 recessed by a predetermined depth in the image side Lb on the inner peripheral side of the annular bottom surface 53 and a circular opening 55 provided at the center of the recess portion 54.

The cemented lens L9 is positioned in the optical axis L direction by the outer peripheral portion of the fifth lens L5 brought into contact with the lens seating surface 50. The sixth lens L6 disposed the closest to the image side Lb is accommodated inside the recess portion 54 but is not in contact with the inner surface of the recess portion 54 and is positioned in the optical axis L direction via the fifth lens L5.

The fourth lens L4 located on the object side La of the cemented lens L9 is held by the holder 3, and the holder 3 is brought into contact with the outer peripheral portion of the fifth lens L5 in the optical axis L direction. The outer peripheral portion of the third lens L3 located on the object side La of the fourth lens L4 is in contact with the outer peripheral portion of the holder 3 in the optical axis L direction via the diaphragm L8. Further, the outer peripheral portion of the second lens L2 located on the object side La of the third lens L3 is in contact with the outer peripheral portion of the third lens L3 in the optical axis L direction via the light-shielding plate L7. Therefore, the second lens L2, the third lens L3, and the fourth lens L4 are all positioned in the optical axis L direction with reference to the lens seating surface 50. The second lens L2 is caulked and fixed by a caulking portion 56 provided on an end portion on the object side La of the cylindrical portion 51.

Transparent Conductive Film

The lens unit 1 includes a transparent conductive film 16 disposed on the surface of the first lens L1. The transparent conductive film 16 is a resistive element that generates heat when energized, and is a heater that directly heats the first lens L1. As shown in FIGS. 1 and 2, the first lens L1 includes an object-side lens surface 11 convex to the object side La, an image-side lens surface 12 concave to the object side La, an image-side flange surface 13 surrounding the outer peripheral side of the image-side lens surface 12, and an annular stepped portion 14 recessed to the object side La on the outer peripheral side of the image-side flange surface 13. The image-side flange surface 13 is an annular flat surface perpendicular to the optical axis L. The O-ring 7 is disposed in the annular stepped portion 14.

Figure 5A:
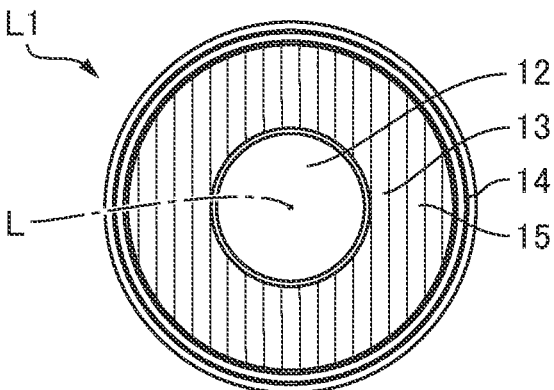
FIGS. 5A, 5B, 5C, and 5D are explanatory views of a transparent conductive film, an extraction electrode, and a blackened film disposed on the first lens.
Figure 5B:
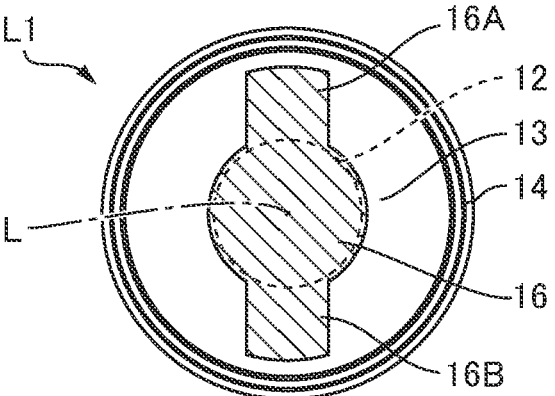
Figure 5C:
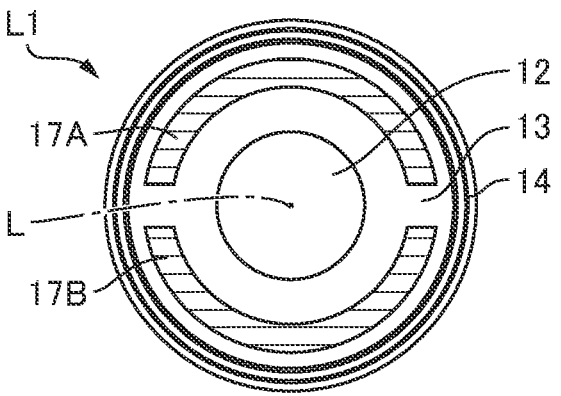
Figure 5D:
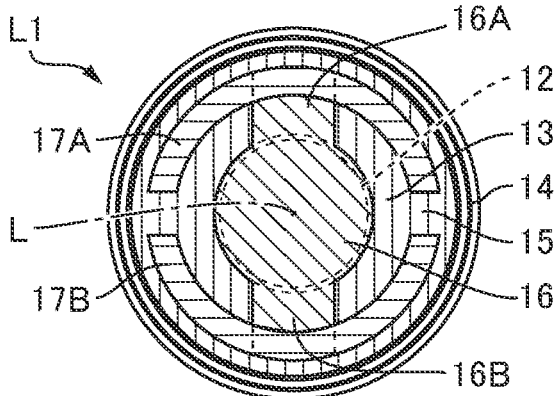

FIGS. 5A, 5B, 5C, and 5D are explanatory views of the transparent conductive film 16, extraction electrodes 17A and 17B, and a blackened film 15 disposed on the first lens L1. FIGS. 5A to 5D are plan views of the first lens L1 viewed from the image side Lb. FIG. 5A shows a planar shape of the blackened film 15, FIG. 5B shows the planar shape of the transparent conductive film 16, and FIG. 5C shows the planar shapes of the extraction electrodes 17A and 17B. FIG. 5D shows a state in which the transparent conductive film 16, the extraction electrodes 17A, 17B, and the blackened film 15 are stacked on the image-side lens surface 12 and the image-side flange surface 13.

The image-side flange surface 13 is a light diffusing surface and has fine irregularities (shibo) formed on the entire surface. In the present embodiment, the blackened film 15 is formed on the image-side flange surface 13. The blackened film 15 is formed, for example, by applying a black paint. The first lens L1 diffuses light by means of the fine irregularities (shibo) and absorbs light by means of black paint and thus, lowering of the optical performance caused by ghosting can be suppressed. As shown in FIG. 5A, the blackened film 15 is formed on substantially the entire image-side flange surface 13.

The transparent conductive film 16 is disposed on the image-side lens surface 12. In the present embodiment, the transparent conductive film 16 is an ITO film. A process of forming the transparent conductive film 16 on the image-side lens surface 12 is performed after the blackened film 15 is formed on the image-side flange surface 13. In the lens unit 1, the image-side lens surface 12 is uniformly heated by energizing the transparent conductive film 16. Power is fed to the transparent conductive film 16 via the extraction electrodes 17A and 17B disposed on the image-side flange surface 13.

As shown in FIG. 5B, the transparent conductive film 16 includes two arm portions 16A and 16B disposed on the image-side flange surface 13. The arm portions 16A and 16B extend from the outer peripheral edge of the image-side lens surface 12 in two directions opposite to each other in the radial direction. The extraction electrodes 17A and 17B are disposed symmetrically to the optical axis L at the center. The extraction electrode 17B extends in an arc shape in the circumferential direction around the tip end of the arm portion 16B. The arm portions 16A and 16B and the extraction electrodes 17A and 17B are stacked on top of a blackened film 15.

Flexible Printed Circuit Board

As shown in FIGS. 1 and 2, the lens unit 1 includes a flexible printed circuit board 8. The flexible printed circuit board 8 extends outward in the radial direction from between the first lens L1 and the second lens L2, is bent at an approximately right angle, is passed through a through hole 46 formed in the first housing portion 4 of the lens holder 2, and is pulled out to the image side Lb of the lens holder 2.

On the flexible printed circuit board 8, power feed wiring 85 and electrodes 84 for feeding power to the transparent conductive film 16 are disposed. Further, a heater 9 is disposed on the flexible printed circuit board 8. That is, in the present embodiment, a heat generating unit (heater) is provided at two locations, that is, on the first lens L1 and the flexible printed circuit board 8, respectively.

Figure 6:
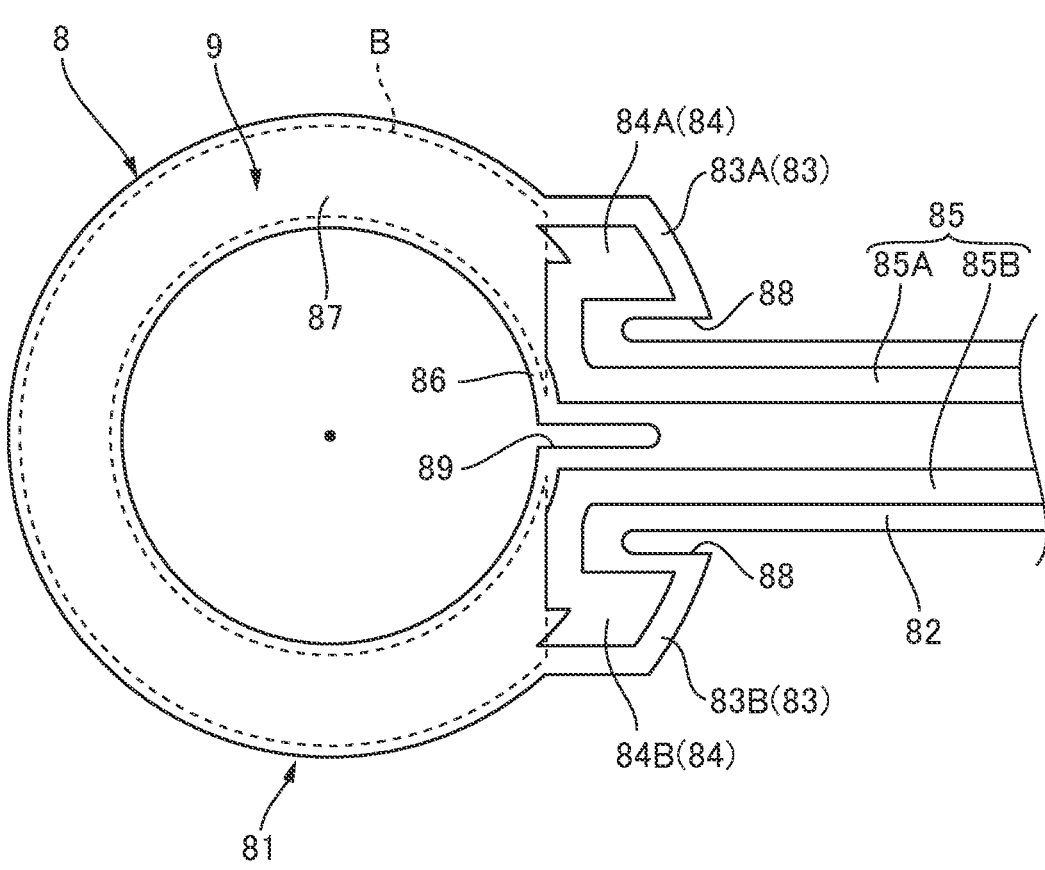
FIG. 6 is a plan view of a flexible printed circuit board.

FIG. 6 is a plan view of the flexible printed circuit board 8. The flexible printed circuit board 8 includes an annular flat surface portion 81 along the image-side flange surface 13, an extension portion 82 extending linearly from the flat surface portion 81 outward in the radial direction, and protruding portions 83 projecting outward in the radial direction from the flat surface portion 81 on both sides in the circumferential direction of the extension portion 82. The heater 9 is disposed on the flat surface portion 81. The region where the heater 9 is located is, for example, a region B enclosed by a broken line in FIG. 6. In the region B, a pattern of a conductive material (not shown) that generates heat when energized is formed.

On the protruding portion 83 of the flexible printed circuit board 8, the electrodes 84 electrically connected to the extraction electrodes 17A and 17B provided on the first lens L1 are disposed. Moreover, the power feed wiring 85 connected to the electrodes 84 and the heater 9 is disposed on the extension portion 82. In more detail, the protruding portion 83 includes a first protruding portion 83A disposed on one side in the circumferential direction of the extension portion 82 and a second protruding portion 83B disposed on the other side in the circumferential direction of the extension portion 82. The electrode 84 includes a first electrode 84A disposed on the first protruding portion 83A and a second electrode 84B disposed on the second protruding portion 83B. The power feed wiring 85 includes a first power feed wiring 85A connected to the first electrode 84A and a second power feed wiring 85B connected to the second electrode 84B. One of the first electrode 84A and the second electrode 84B is a positive electrode, and the other of the first electrode 84A and the second electrode 84B is a negative electrode.

The flat surface portion 81 of the flexible printed circuit board 8 includes a connecting portion 86 disposed on an inner side in the radial direction of the extension portion 82 and an arc portion 87 extending in the circumferential direction on both sides in the circumferential direction of the connecting portion 86. The arc portion 87 is connected to the extension portion 82 via the connecting portion 86. The protruding portion 83 protrudes outward in the radial direction from the arc portion 87 on both sides in the circumferential direction of the connecting portion 86.

The first power feed wiring 85A and the second power feed wiring 85B extend substantially in parallel in an electrically insulated state in the extension portion 82, and extend to opposite sides in the circumferential direction in the connecting portion 86. The first power feed wiring 85A extending to one side in the circumferential direction extends outward in the radial direction toward the first protruding portion 83A and is connected to the first electrode 84A. Further, the second power feed wiring 85B extending to the other side in the circumferential direction extends outward in the radial direction toward the second protruding portion 83B and is connected to the second electrode 84B. In FIG. 6, only the disposed region of the electrodes 84 and the power feed wiring 85 is illustrated, and the detailed configuration of the electrodes 84 and the power feed wiring 85 is not shown. The electrode 84 only needs to be disposed on the protruding portion 83, and its disposed region is not limited to the region shown in FIG. 6. Further, the disposed region of the power feed wiring 85 is not limited to the region shown in FIG. 6, either.

The flexible printed circuit board 8 includes a flexible substrate 80A made of a resin film such as polyimide, and patterns such as wiring and electrodes formed on the flexible substrate 80A by a conductive material such as Cu. In the present embodiment, the electrode 84 for energizing the transparent conductive film 16, the power feed wiring 85 for feeding power to the transparent conductive film 16 and the heater 9, and a pattern of the conductive material that functions as the heater 9 are formed on the flexible substrate 80A. An overcoat is applied to the surface of the flexible substrate 80A so as to cover the pattern of the conductive material. Further, some of the patterns of the conductive material are exposed without being overcoated. For example, the electrodes 84 to be electrically connected to the transparent conductive film 16 are not covered by the overcoat.

The flexible printed circuit board 8 includes a first notch portion 88 in which a portion adjacent to the protruding portion 83 in the circumferential direction is notched linearly toward the inner side in the radial direction. In more detail, the first notch portion 88 is provided at two locations: between the first protruding portion 83A and the extension portion 82, and between the second protruding portion 83B and the extension portion 82. By providing the first notch portion 88, warping of the first protruding portion 83A and the second protruding portion 83B is suppressed. In addition, the electrode 84 and the power feed wiring 85 are hardly short-circuited.

The flexible printed circuit board 8 also includes a second notch portion 89 in which an inner peripheral edge of the connecting portion 86 is linearly notched toward the outer side in the radial direction. The second notch portion 89 is located substantially at a center in the circumferential direction of the extension portion 82 and is disposed between the first power feed wiring 85A and the second power feed wiring 85B. By providing the second notch portion 89, warping of the connecting portion 86 is suppressed, and the first power feed wiring 85A and the second power feed wiring 85B are hardly short-circuited.

In the present embodiment, the first notch portion 88 and the second notch portion 89 are used as adhesive application grooves. When the lens unit 1 is assembled, the flexible printed circuit board 8 is fixed to the image-side flange surface 13 by an adhesive disposed in the first notch portion 88 and the second notch portion 89.

Figure 7:
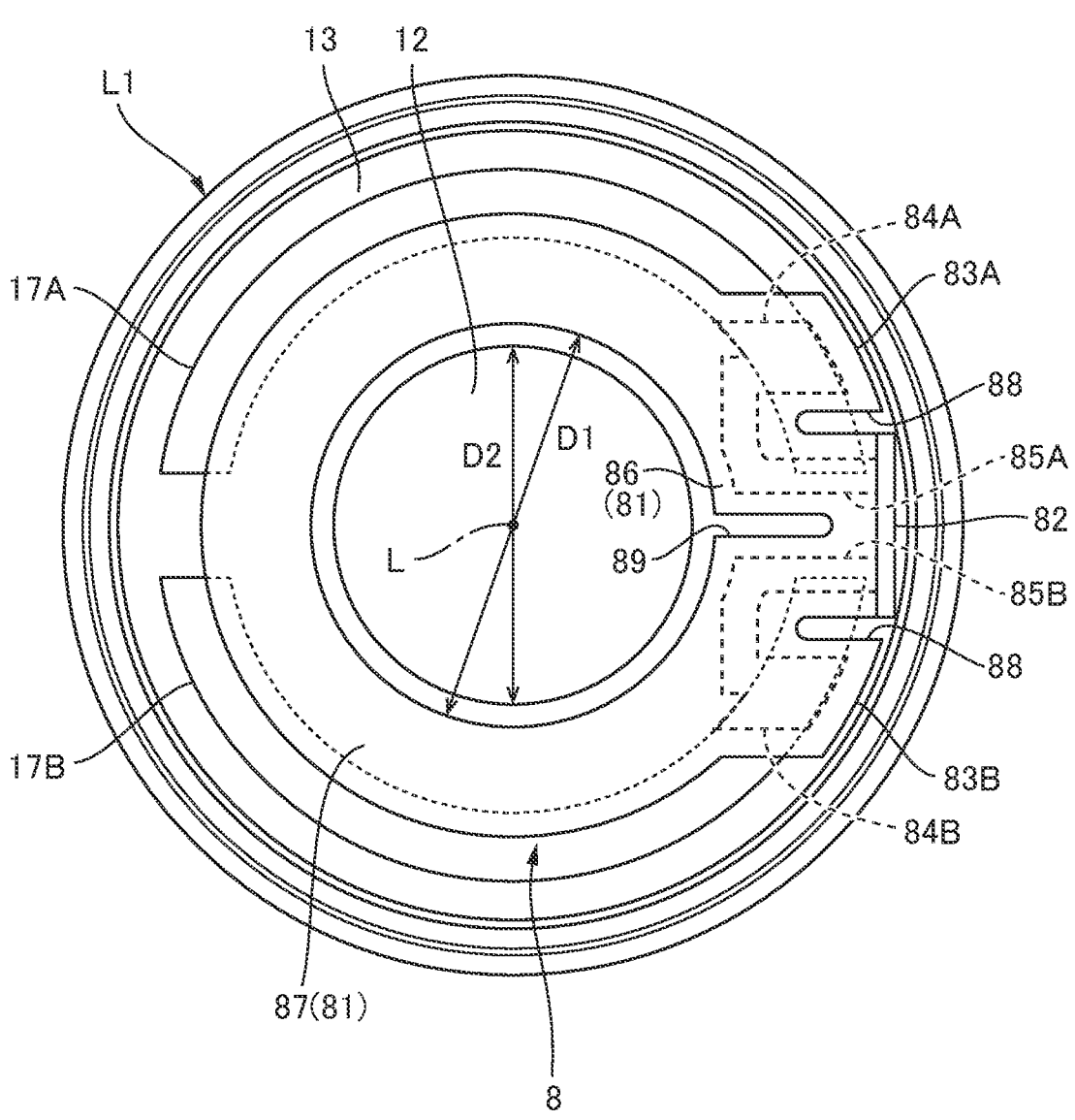
FIG. 7 is an explanatory view illustrating arrangement of a flexible printed circuit board and the extraction electrode on the image-side flange surface.

FIG. 7 is an explanatory view showing the arrangement of the flexible printed circuit board 8 and the extraction electrodes 17A, 17B on the image-side flange surface 13. As shown in FIG. 7, when the flat surface portion 81 of the flexible printed circuit board 8 is to be fixed to the image-side flange surface 13, the flat surface portion 81 is positioned so that the center of the image-side flange surface 13 and the center of the flat surface portion 81 coincide. The shape of the flat surface portion 81 is set to such a shape that is unlikely to affect the optical performance of the lens unit 1. In the present embodiment, an inner diameter D1 of the flat surface portion 81 is larger than an inner diameter D2 of the image-side flange surface 13 by a predetermined dimension (e.g., 0.4 mm). Therefore, there is little risk of the inner peripheral edge of the flat surface portion 81 to protrude to the inner side of the image-side lens surface 12 and to lower the optical performance.

When the flat surface portion 81 is to be fixed to the image-side flange surface 13, the flat surface portion 81 is positioned in the circumferential direction so as to dispose the second notch portion 89 provided at the center in the width direction of the extension portion 82 at the center of a circumferential gap between the two extraction electrodes 17A and 17B. As a result, the first electrode 84A overlaps with the extraction electrode 17A, and the second electrode 84B overlaps with the extraction electrode 17B. Therefore, the power feed wiring 85 is electrically connected to the transparent conductive film 16 through the arm portions 16A and 16B and the extraction electrodes 17A and 17B.

In the present embodiment, since the extraction electrodes 17A and 17B extend in the circumferential direction, the power feeding position to the extraction electrode 17A and the power feeding position to the extraction electrode 17B can be brought closer. Therefore, the first electrode 84A and the second electrode 84B for connection with the extraction electrodes 17A and 17B can be concentratedly disposed close to the extension portion 82. As a result, the power feed wiring 85 to be provided between the extension portion 82 and the first and second electrodes 84A and 84B can be made short and simple in shape.

Positioning of the First Lens in the Optical Axis L Direction

Figure 8:
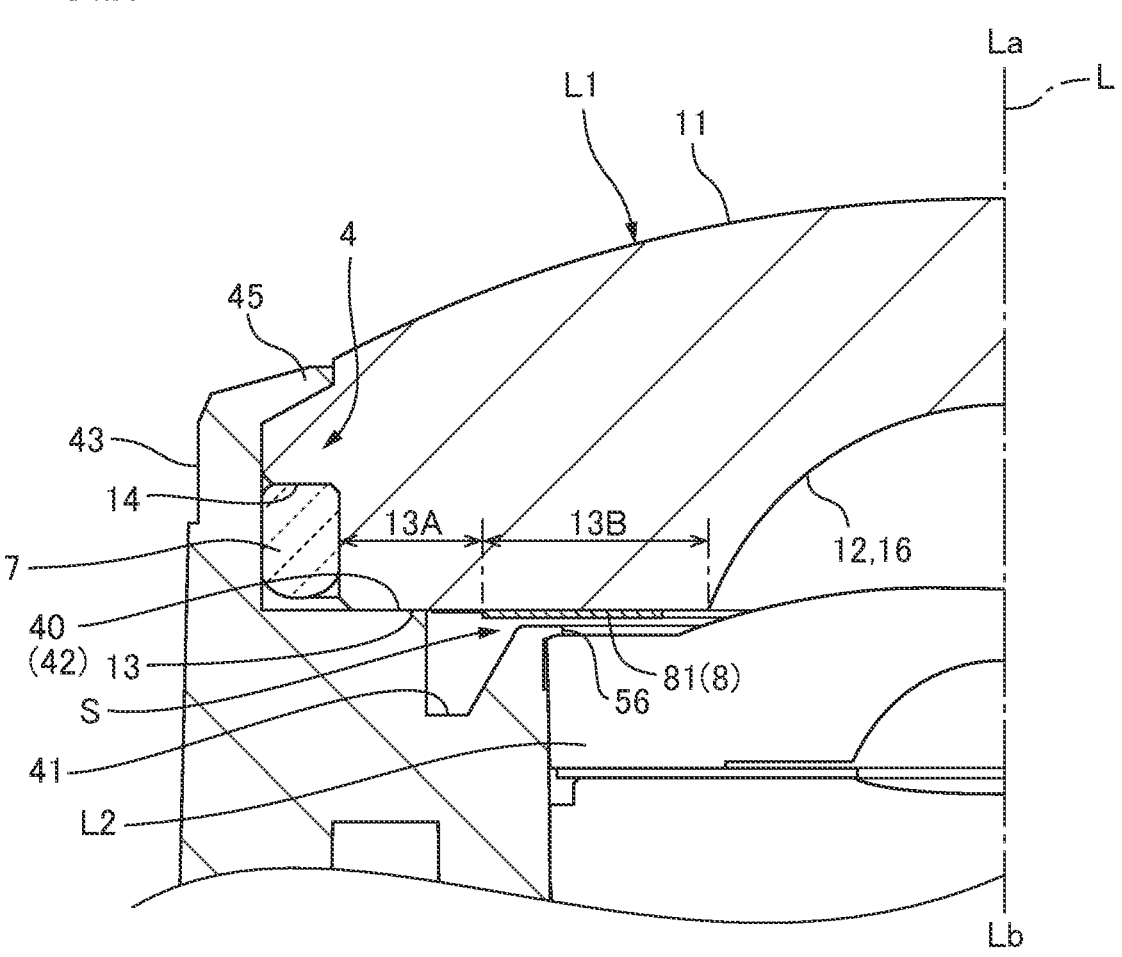
FIG. 8 is a partially enlarged cross-sectional view of the lens unit.

FIG. 8 is a partially enlarged cross-sectional view of the lens unit 1, which is cut at a C-C position in FIG. 4B. As shown in FIG. 8, the lens holder 2 includes the regulation portion 42 protruding from the bottom surface of the first housing portion 4 to the object side La, and the image-side flange surface 13 of the first lens L1 includes an outer peripheral region 13A which is brought into contact with the lens seating surface 40 provided at the tip end of the regulation portion 42. Further, the image-side flange surface 13 includes an inner peripheral region 13B located on the inner peripheral side of the outer peripheral region 13A, and the flat surface portion 81 of the flexible printed circuit board 8 is disposed on the inner peripheral region 13B.

When the first lens L1 is attached to the first housing portion 4, as shown in FIG. 4B and FIG. 8, the flat surface portion 81 disposed in the inner peripheral region 13B of the image-side flange surface 13 is disposed on the inner peripheral side of the regulation portion 42. Therefore, the flat surface portion 81 does not interfere with the regulation portion 42, and the flexible printed circuit board 8 is not sandwiched between the first lens L1 and the lens holder 2. In the present embodiment, the position of the first lens L1 in the optical axis L direction is defined by direct contact between the outer peripheral region 13A of the image-side flange surface 13 and the lens seating surface 40.

As shown in FIG. 8, the flat surface portion 81 of the flexible printed circuit board 8 extends farther to the outer side in the radial direction than the caulking portion 56 that fixes the outer peripheral edge of the second lens L2. In the present embodiment, a gap S in the optical axis L direction between the caulking portion 56 and the inner peripheral region 13B of the image-side flange surface 13 is larger than a thickness of the flexible printed circuit board 8. Therefore, the flat surface portion 81 does not interfere with the caulking portion 56, and the flexible printed circuit board 8 is not sandwiched between the first lens L1 and the caulking portion 56.

Counterbore Portion

As shown in FIGS. 2, 3, and 4, the first housing portion 4 includes a counterbore portion 47 recessed to the outer side in the radial direction from the inner peripheral edge of the regulation portion 42. As shown in FIG. 4B, the extension portion 82 and the protruding portion 83 of the flexible printed circuit board 8 are disposed in the counterbore portion 47. Further, as shown in FIG. 2, the extension portion 82 is bent to the image side Lb on the way of extending outward in the radial direction and is inserted into the slit-shaped through hole 46 opened in the bottom surface of the counterbore portion 47. Therefore, the extension portion 82 and the protruding portion 83 do not interfere with the regulation portion 42. The extension portion 82 may include a reinforcing plate 80B that is fixed to the flexible substrate 80A. If the reinforcing plate 80B is provided, the reinforcing plate 80B is disposed in the through hole 46.

As shown in FIGS. 1 and 2, the through hole 46 penetrates the bottom part of the first housing portion 4 in the optical axis L direction and communicates with a gap between the cylindrical portion 51 of the second housing portion 5 and the lens case 6. The inner peripheral surface of the lens case 6 is recessed in a shape that follows the edge on the outer side in the radial direction of the through hole 46. The extension portion 82 inserted in the through hole 46 is withdrawn to the image side Lb of the lens holder 2 through the gap between the inner peripheral surface of the lens case 6 and the outer peripheral surface of the cylindrical portion 51.

In the present embodiment, the extension portion 82 is not fixed to the through hole 46, but an adhesive can be disposed in the through hole 46 so that the adhesive can fix the extension portion 82 to the through hole 46. In this case, by forming irregularities on the inner peripheral surface of the through hole 46, an adhesive area can be increased, and the fixing strength of the extension portion 82 can be enhanced.

The regulation portion 42 includes an outer edge portion 48 extending in the circumferential direction on the outer side in the radial direction of the counterbore portion 47. The outer edge portion 48 is connected to the lens seating surface 40 provided on both sides in the circumferential direction of the counterbore portion 47. Therefore, in the present embodiment, the regulation portion 42 is annular as a whole and faces the outer peripheral edge of the first lens L1 over the entire circumference. Therefore, since the O-ring 7 disposed at the outer peripheral edge of the first lens L1 is supported by the regulation portion 42 over the entire circumference, falling of the O-ring 7 into the inner side of the counterbore portion 47 which causes lowering of the sealing performance can be avoided.

Main Effects of the Present Embodiment

As described above, the lens unit 1 of the present embodiment has the first lens L1 the closest to the object side La, the second lens L2 disposed on the image side Lb with respect to the first lens L1, the lens holder 2 including the first housing portion 4 that accommodates the first lens L1 and the second housing portion 5 that accommodates the second lens L2, the transparent conductive film 16 (conductive film) disposed on the image-side lens surface 12 of the first lens L1, and the flexible printed circuit board 8 that feeds power to the transparent conductive film 16. The first lens L1 includes the image-side flange surface 13 surrounding the image-side lens surface 12. The flexible printed circuit board 8 includes a flat surface portion 81 along the image-side flange surface 13, an extension portion 82 extending to the outer side in the radial direction, and a protruding portion 83 projecting to the outer side in the radial direction from the flat surface portion 81. The protruding portion 83 includes electrodes 84 (first electrode 84A, second electrode 84B) electrically connected to the transparent conductive film 16.

In the present embodiment, since the first lens L1 can be heated directly by the transparent conductive film 16, condensation inside the lens unit 1 which causes the lowering of the optical performance can be suppressed. In addition, in the flexible printed circuit board 8 that feeds power to the transparent conductive film 16, the electrodes 84 for connection to the transparent conductive film 16 are disposed on the protruding portion 83 that projects to the outer side in the radial direction. Therefore, interference of the connection portion between the electrodes 84 (first electrode 84A, second electrode 84B) on the flexible printed circuit board 8 and the extraction electrodes 17A, 17B in contact with the electrodes 84 with the component disposed on the image side Lb of the first lens L1 (the second lens L2 or the second housing portion 5, for example) can be avoided easily. Thus, there is little risk that the electrodes 84 and wiring on the flexible printed circuit board 8 are sandwiched and crushed between the first lens L1 and the other components (the second lens L2 or the second housing portion 5), and there is little risk of short-circuiting of the crushed electrodes 84 and wiring.

For example, in the present embodiment, the flat surface portion 81 of the flexible printed circuit board 8 extends to the outer side in the radial direction from a caulking portion 56 that fixes the outer peripheral edge of the second lens L2 (see FIG. 8). Therefore, the protruding portion 83, which is disposed further on the outer side in the radial direction than the outer peripheral edge of the flat surface portion 81, is disposed entirely further on the outer side in the radial direction than the caulking portion 56 and does not interfere with the caulking portion 56. Therefore, the connection portions between the electrodes 84 disposed on the protruding portion 83 and the extraction electrodes 17A and 17B in contact with the electrodes 84 are not sandwiched and crushed between the caulking portion 56 and the first lens L1. Thus, there is little risk that the wiring and electrodes 84 on the flexible printed circuit board 8 are crushed, which causes a short circuit.

In the present embodiment, the first housing portion 4 that accommodates the first lens L1 includes a regulation portion 42 having a lens seating surface 40 in contact with the image-side flange surface 13, and the counterbore portion 47 recessed to the outer side in the radial direction from the inner peripheral edge of the regulation portion 42. In the flexible printed circuit board, since the flat surface portion 81 is disposed on the inner peripheral side of the regulation portion 42 and the protruding portion 83 is disposed on the counterbore portion 47, the protruding portion 83 on which the electrode 84 is disposed does not interfere with the regulation portion 42. In this way, in the present embodiment, since a bottom part of the first housing portion 4 has such a shape that does not interfere with the protruding portion 83 on which the electrodes 84 are disposed, there is little risk that the connection portions between the electrodes 84 on the flexible printed circuit board 8 and the extraction electrodes 17A and 17B in contact with the electrodes 84 are sandwiched between the lens holder 2 and the first lens L1. Thus, there is little risk that the electrodes 84 and the wiring on the flexible printed circuit board 8 are crushed, which causes a short circuit.

In the present embodiment, the flexible printed circuit board 8 includes a first notch portion 88 adjacent to the protruding portion 83 in the circumferential direction. Since the first notch portion is notched toward an inner side in the radial direction, warping of the outer peripheral portion of the flexible printed circuit board 8 can be suppressed. In addition, since the electrodes 84 provided on the protruding portion 83 are separated from other wiring and electrodes, there is little risk of short-circuiting between the electrodes 84 and other wiring or electrodes.

In the present embodiment, the protruding portion 83 of the flexible printed circuit board 8 includes a first protruding portion 83A disposed on one side in the circumferential direction of the extension portion 82 and a second protruding portion 83B disposed on the other side in the circumferential direction of the extension portion 82. Therefore, since the positive and negative electrodes 84 (the first electrode 84A and the second electrode 84B) can be concentrated and disposed on both sides of the extension portion 82, the wiring to the positive and negative electrodes 84 can be made short and simple in shape. In addition, the first notch portion 88 is disposed between the extension portion 82 and the first protruding portion 83A, and between the extension portion 82 and the second protruding portion 83B. Therefore, since the wiring of the extension portion 82 and the positive and negative electrodes 84 can be separated by the first notch portion 88, there is little risk of short-circuiting between the wiring of the extension portion 82 and the positive and negative electrodes 84.

In the present embodiment, the flat surface portion 81 of the flexible printed circuit board 8 is annular, and a connecting portion 86 connecting to the extension portion 82 is provided on a part in the circumferential direction of the flat surface portion 81. Since the flexible printed circuit board 8 includes a second notch portion 89 having the inner peripheral edge of the connecting portion 86 notched toward the outer side in the radial direction, warping of the inner peripheral portion of the flexible printed circuit board 8 can be suppressed. In addition, there is little risk of short-circuiting of the wiring disposed on the connecting portion 86. For example, there is little risk of short-circuiting between a first power feed wiring 85A disposed on one side in the circumferential direction of the connecting portion 86 and a second power feed wiring 85B disposed on the other side in the circumferential direction of the connecting portion 86.

In the present embodiment, the first notch portion 88 and the second notch portion 89 are used as adhesive application grooves for applying an adhesive for fixing the flexible printed circuit board 8 to the first lens L1. In this way, by placing the adhesive in the groove of the flexible printed circuit board 8, the fixing strength of the flexible printed circuit board 8 can be enhanced. In addition, since the vicinity of the protruding portion 83 can be fixed, the electrodes 84 provided on the protruding portion 83 are unlikely to be lifted from the image-side flange surface 13.

In the present embodiment, the transparent conductive film 16 has the arm portions 16A and 16B disposed on the image-side flange surface 13, and the arm portions 16A and 16B are connected to the electrodes 84 via the extraction electrodes 17A and 17B disposed on the image-side flange surface 13. Therefore, when the transparent conductive film 16 is connected to the flexible printed circuit board 8, there is little risk that a part other than the extraction electrodes 17A and 17B and the electrodes 84 are short-circuited.

In the present embodiment, the blackened film 15 is formed on the image-side flange surface 13 of the first lens L1, and the arm portions 16A, 16B and the extraction electrodes 17A, 17B are stacked on top of the blackened film 15. Therefore, since the blackened film 15 is formed on the surface that overlaps with the flexible printed circuit board 8, the lowering of optical performance caused by the placement of the flexible printed circuit board 8 on the image-side flange surface 13 can be suppressed. In addition, since ghosting caused by the light transmitted through the image-side flange surface 13 can be suppressed by the blackened film 15, the lowering of the optical performance caused by the ghosting can be suppressed. Further, when irregularities (shibo) are formed on the image-side flange surface 13 for diffusing the light, the irregularities (shibo) are filled and smoothed by the blackened film 15. Therefore, the arm portions 16A, 16B of the transparent conductive film 16 and the extraction electrodes 17A, 17B can be formed easily on the image-side flange surface 13.

In the present embodiment, since the flexible printed circuit board 8 includes the heater 9 disposed on the flat surface portion 81, both the transparent conductive film 16 and the heater 9 on the flexible printed circuit board 8 can be made to generate heat. Therefore, the risk of condensation can be further reduced.

Modification of Conductive Film

Figure 9A:
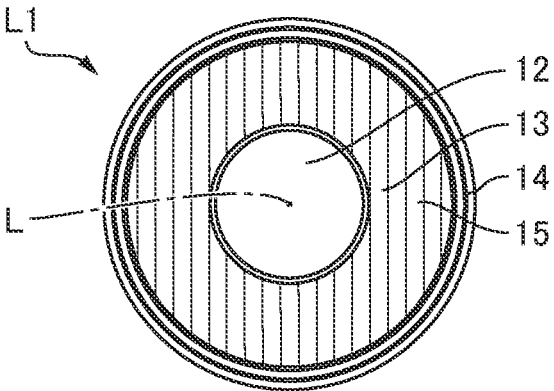
FIGS. 9A, 9B, 9C, and 9D are explanatory views of a metal thin film, a protective film, and a blackened film disposed on the first lens.
Figure 9B:
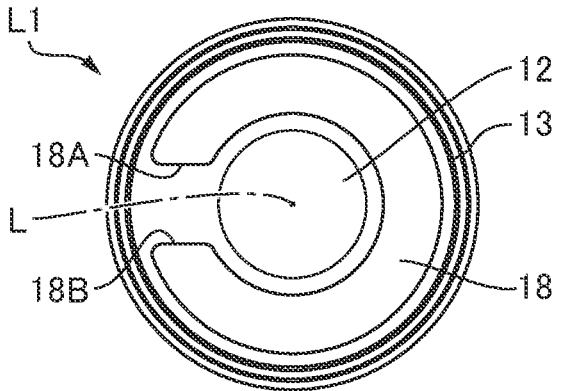
Figure 9C:
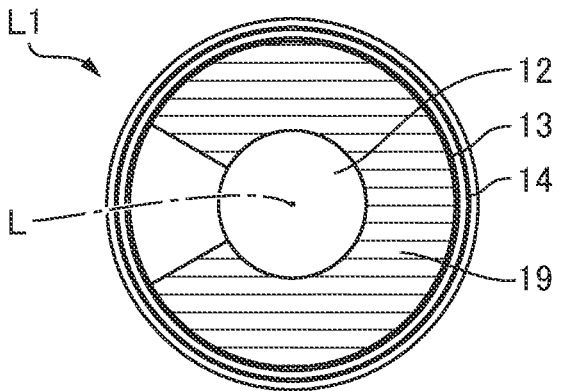
Figure 9D:
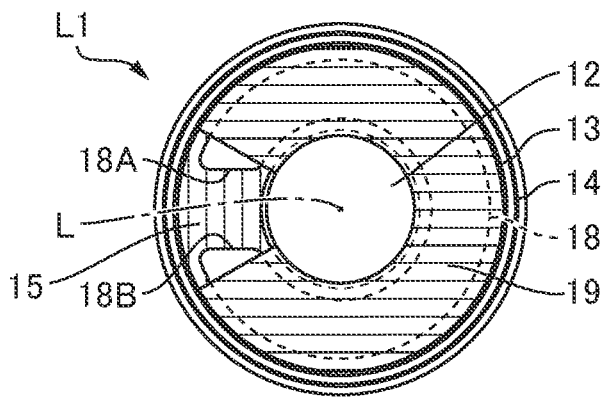

The above embodiment has a configuration in which the transparent conductive film 16 such as an ITO film is disposed on the image side surface (image-side lens surface 12 and image-side flange surface 13) of the first lens L1 as a conductive film that directly heats the first lens L1, but such a configuration in which other conductive films are disposed on the image side surface of the first lens L1 can also be employed. FIGS. 9A, 9B, 9C, and 9D are explanatory views of the metal thin film 18, the protective film 19, and the blackened film 15 disposed on the first lens L1. FIGS. 9A, 9B, 9C, and 9D are plan views of the first lens L1 viewed from the image side Lb. FIG. 9A shows the planar shape of the blackened film 15, FIG. 9B shows the planar shape of the metal thin film 18, and FIG. 9C shows the planar shape of the protective film 19. FIG. 9D shows the state in which the metal thin film 18, the protective film 19, and the blackened film 15 are stacked on the image-side flange surface 13.

The metal thin film 18 is a conductive film and is disposed on the image-side flange surface 13 of the first lens L1. The metal thin film 18 is constituted by, for example, a NiFe film, a Ni film or a Cr film, a laminated film in which the Ni film and the Cr film are laminated, and the like. The metal thin film 18 is stacked on top of the blackened film 15. As shown in FIG. 9B, the metal thin film 18 is disposed on a part in the circumferential direction of the image-side flange surface 13. In the present embodiment, the metal thin film 18 extends in an arc shape on the image-side flange surface 13 and has a C-shaped planar shape. The tip end portion 18A on one side in the circumferential direction of the metal thin film 18 and the tip end portion 18B on the other side in the circumferential direction of the metal thin film 18 face each other with a predetermined gap in the circumferential direction.

The protective film 19 has low moisture permeability and can protect the metal thin film 18 from moisture. For example, a non-conductive film such as a SiO2 film is preferably used for the protective film 19. The protective film 19 is stacked on top of the metal thin film 18. As shown in FIG. 9C, the protective film 19 has a C-shaped planar shape similarly to the metal thin film 18. The protective film 19 extends over the entire range in the radial direction from the inner peripheral edge to the outer peripheral edge of the image-side flange surface 13, but an angular range in which the protective film 19 is provided is smaller than the angular range in which the metal thin film 18 is provided. Therefore, as shown in FIG. 9D, the entire range of the metal thin film 18, except for the tip end portions 18A and 18B, is covered by the protective film 19.

In the lens unit 1, the image-side flange surface 13 is heated by energizing the metal thin film 18. Power is fed to the metal thin film 18 via the tip end portions 18A and 18B exposed from the protective film 19. When the flat surface portion 81 of the flexible printed circuit board 8 is disposed on the protective film 19 disposed on the image-side flange surface 13, the electrodes 84 provided on the protruding portions 83 projecting from the flat surface portion 81 are brought into contact with the tip end portions 18A and 18B of the metal thin film 18. Therefore, the metal thin film 18 is energized via the electrode 84.

In this way, in the modification shown in FIGS. 9A to 9D, the conductive film disposed on the image-side surface of the first lens L1 is made of the metal thin film 18, the metal thin film 18 is disposed on a part in the circumferential direction of the image-side flange surface 13, and the tip end portions 18A and 18B in the circumferential direction of the metal thin film 18 are connected to the electrodes 84 for power feed disposed on the flexible printed circuit board 8. Therefore, since the image-side flange surface 13 of the first lens can be directly heated by the metal thin film 18, condensation inside the lens unit 1 which causes lowering of the optical performance can be suppressed. In addition, compared with the case where the transparent conductive film 16 is formed on the image-side lens surface 12, influence of ghosting or the like on the optical performance can be reduced.

In the modification shown in FIGS. 9A to 9D, the blackened film 15 formed on the image-side flange surface 13 of the first lens L1 is provided, and the metal thin film 18 is laminated on the blackened film 15. In addition, a protective film 19 is laminated on top of the metal thin film 18, and the metal thin film 18 is covered by the protective film 19 over the entire range except for the tip end portion. Further, the flat surface portion 81 is annular, and the flat surface portion 81 is disposed on the protective film 19. Therefore, as in the above embodiment, since the flexible printed circuit board 8 overlaps with the blackened film 15, the lowering of optical performance caused by the placement of the flexible printed circuit board 8 can be suppressed. In addition, since ghosting caused by the light transmitted through the image-side flange surface 13 can be suppressed by the blackened film 15, the lowering of the optical performance caused by the ghosting can be suppressed. Further, since the protective film 19 is provided, the metal thin film 18 can be protected, and environmental resistance can be improved. In particular, in a high-temperature and high-humidity state, there is a risk that the metal thin film 18 is oxidized and cracked, resulting in a change in a resistance value, but the protection of the metal thin film 18 by the protective film 19 can suppress occurrence of cracks. Therefore, the change in the resistance value of the metal thin film 18 can be suppressed, and variation of the heat generation amount can be suppressed. Further, when the flexible printed circuit board 8 is disposed on the first lens L1, the protective film 19 can be used as a fixing surface to fix the flat surface portion 81.

Other Modifications (1) In the above embodiment, the heater 9 is disposed on the flat surface portion 81 of the flexible printed circuit board 8, but it may be configured such that the heater 9 is not provided, and the flexible printed circuit board 8 includes only the transparent conductive film 16 or the power feed wiring 85 for feeding power to the metal thin film 18 and the electrode 84.

(2) In the above embodiment, the flat surface portion 81 of the flexible printed circuit board is annular, but a part in the circumferential direction of the flat surface portion 81 may be missing in the shape.

What is claimed is:

1. A lens unit comprising:

a first lens located the closest to an object side;

a second lens disposed on an image side with respect to the first lens;

a lens holder including a first housing portion that accommodates the first lens and a second housing portion that accommodates the second lens;

a transparent conductive film disposed on an image-side surface of the first lens; and a flexible printed circuit board that feeds power to the transparent conductive film, wherein the image-side surface of the first lens includes an image-side lens surface and an image-side flange surface that surrounds the image-side lens surface, the image-side lens surface of the first lens is concave and forms an optically active portion, and the image-side flange surface of the first lens is an annular flat surface perpendicular to the optical axis, the transparent conductive film has a portion disposed on the optically active portion of the first lens and arm portions disposed on the image-side flange surface of the first lens, the flexible printed circuit board includes a flat surface portion along the image-side flange surface of the first lens, an extension portion that extends to an outer side in a radial direction; and a protruding portion that project to the outer side in the radial direction from the flat surface portion, the protruding portion of the flexible printed circuit board includes an electrode electrically connected to the transparent conductive film, the arm portions of the transparent conductive film are connected to the electrode via extraction electrodes disposed on the image-side flange surface of the first lens, the transparent conductive film is a resistive element that generates heat when energized, and is a heater that directly heats the first lens, power is fed to the transparent conductive film via the extraction electrodes, the first housing portion of the lens holder includes a recess and a regulation portion having a face in a direction perpendicular to the optical axis, the image-side flange surface being in contact with the face, the recess extends toward the outer side in the radial direction from an inner peripheral edge of the regulation portion, the flat surface portion of the flexible printed circuit board is disposed on an inner peripheral side of the regulation portion of the first housing portion, and the protruding portion of the flexible printed circuit board is disposed on the recess of the first housing portion.

2. The lens unit according to claim 1, further comprising: a blackened film formed on the image-side flange surface, wherein the arm portions and the extraction electrodes are stacked on top of the blackened film.

3. The lens unit according to claim 1, wherein the flexible printed circuit board includes a first notch portion adjacent to the protruding portion in a circumferential direction; and the first notch portion is notched toward an inner side in a radial direction.

4. The lens unit according to claim 3, wherein the protruding portion includes a first protrusion portion disposed on one side in a circumferential direction of the extension portion and a second protrusion portion disposed on the other side in the circumferential direction of the extension portion; and the first notch portion is provided between the extension portion and the first protrusion portion and between the extension portion and the second protrusion portion.

5. The lens unit according to claim 4, wherein the flat surface portion is annular; a connecting portion connecting to the extension portion is provided on a part in a circumferential direction of the flat surface portion; and the flexible printed circuit board includes a second notch portion having an inner peripheral edge of the connecting portion notched to the outer side in the radial direction.

6. The lens unit according to claim 5, wherein the first notch portion and the second notch portion are adhesive application grooves.

7. The lens unit according to claim 1, wherein the flexible printed circuit board includes a heater disposed on the flat surface portion.

8. The lens unit according to claim 2, wherein the flexible printed circuit board includes a first notch portion adjacent to the protruding portion in a circumferential direction; and the first notch portion is notched toward an inner side in a radial direction.

9. The lens unit according to claim 8, wherein the protruding portion includes a first protrusion portion disposed on one side in a circumferential direction of the extension portion and a second protrusion portion disposed on the other side in the circumferential direction of the extension portion; and the first notch portion is provided between the extension portion and the first protrusion portion and between the extension portion and the second protrusion portion.

10. The lens unit according to claim 9, wherein the flat surface portion is annular; a connecting portion connecting to the extension portion is provided on a part in a circumferential direction of the flat surface portion; and the flexible printed circuit board includes a second notch portion having an inner peripheral edge of the connecting portion notched toward the outer side in the radial direction.

11. The lens unit according to claim 10, wherein the first notch portion and the second notch portion are adhesive application grooves.

12. The lens unit according to claim 1, wherein the flat surface portion of the flexible printed circuit board and the regulation portion of the first housing portion of the lens holder are not in contact with each other.

* * * * *